(No Model.)
H. SCHMACK.
APPLE OR OTHER FRUIT GRINDING MACHINE.
No. 536,047. Patented Mar. 19, 1895.
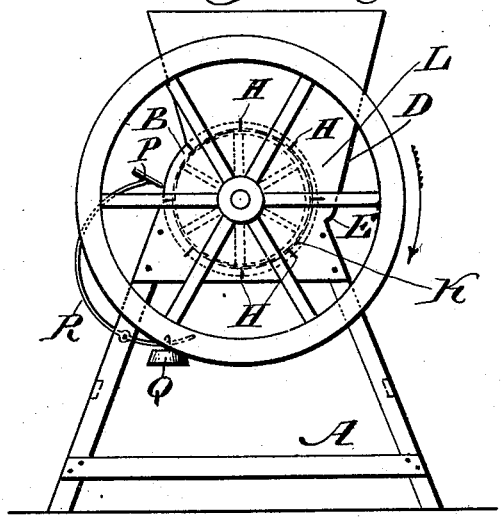
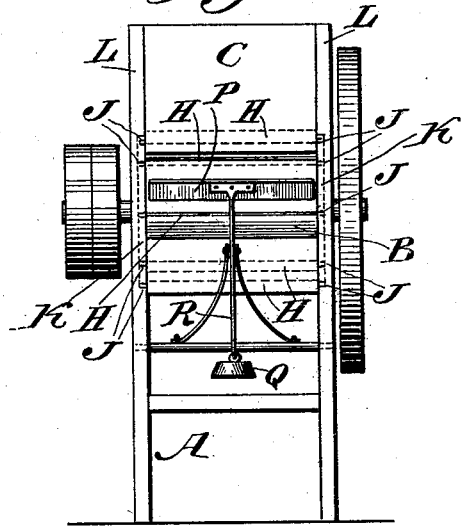
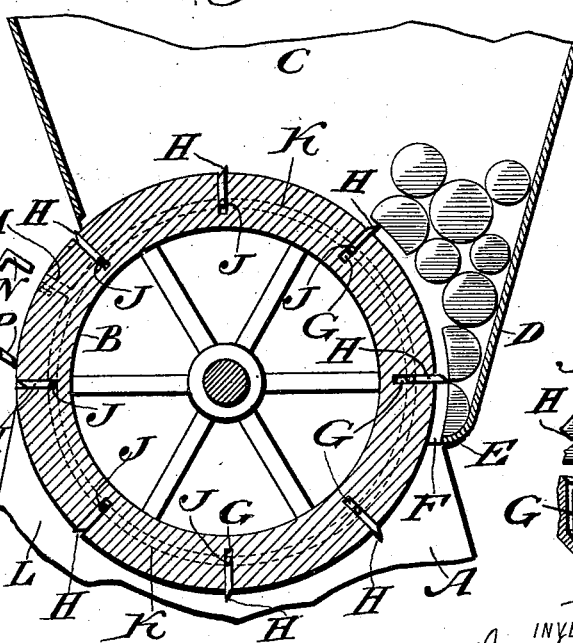
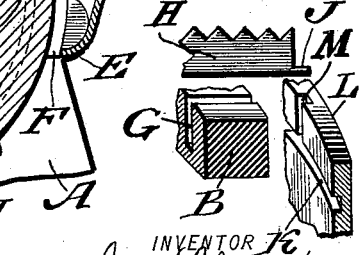
WITNESSES:
L. Douville
P. H. Daigle
INVENTOR
Henry Schmack
BY
John A. Wiedersheim
ATTORNEY.

UNITED STATES PATENT OFFICE.

HENRY SCHMACK, OF PHILADELPHIA, PENNSYLVANIA, ASSIGNOR TO GEORGE ARNHOLT, TRUSTEE, OF SAME PLACE.

APPLE OR OTHER FRUIT GRINDING MACHINE.

SPECIFICATION forming part of Letters Patent No. 536,047, dated March 19, 1895.

Application filed May 15, 1894. Serial No. 511,280. (No model.)

*To all whom it may concern:*

Be it known that I, HENRY SCHMACK, a subject of the Emperor of Austria-Hungary, residing in the city and county of Philadelphia, State of Pennsylvania, have invented a new and useful Improvement in Apple or other Fruit Grinding Machines, which improvement is fully set forth in the following specification and accompanying drawings.

My invention consists of an apple and fruit grinding machine having a hopper with a rotating cylinder provided with sliding plates, substantially as described.

It further consists of the arrangement and combination of parts as hereinafter set forth and claimed.

Figures 1 and 2 represent side elevations of an apple or fruit grinding machine embodying my invention. Fig. 3 represents a vertical section of a portion thereof, on an enlarged scale. Fig. 4 represents a side elevation of a portion of the drum or cylinder of the machine. Fig. 5 represents a view of details of the machine. Fig. 6 represents a side elevation of one of the blades thereof.

Similar letters of reference indicate corresponding parts in the several figures.

Referring to the drawings: A designates the frame of the machine, and B designates a drum or cylinder which is mounted horizontally thereon.

C designates a hopper which has a depending side portion D, whose lower wall E projects toward the periphery of the cylinder between which and said wall is the throat F, through which the ground fruit or pomace is discharged.

In the peripheral portion of the body or heads of the cylinder are radial recesses or grooves G, in which are freely fitted the knives or blades H, on whose ends are gudgeons J, occupying the grooves or recesses K in the side pieces L of the frame A, said grooves extending in a circle around said pieces, but being eccentric to the axis of the cylinder, as shown in dotted lines Fig. 3.

In order introduce the gudgeons J into the grooves K, the pieces L are formed with slots forming passages M, which join the grooves K, and terminate at the outer edges of said pieces. See Fig. 5. After the gudgeons are passed through said passages, they reach the grooves K, after which the passages are closed by plugs or caps N, and thus displacement of the blades is prevented.

The operation is as follows: The hopper is supplied with fruit and the cylinder is rotated, whereby owing to the grooves K and gudgeons J, the blades are gradually moved out from the periphery of the cylinder as they enter the hopper, and thus gradually crush or grind the fruit in an effective and thorough manner, the blades then gradually receding and passing through the throat F, and finally returning into the recesses G, so that they are kept comparatively free of particles of fruit and clean. The pomace escapes through said throat F, and may be directed to a suitable receptacle or place of collection. Pivotally connected with the frame A is a scraper P, which is adjustably held in contact with the periphery of the cylinder B, by means of the weight Q on the arm R, which carries said scraper or scraper-head P, thus clearing said cylinder of particles of fruit, it being noticed that the blades H, owing to their withdrawn position, present no projections to the scraper. After a blade has passed said scraper and enters the hopper, it again gradually emerges from its recess G, and acts upon the fruit in the hopper, it being noticed that the side portion D reduces in width as it descends, so that the fruit in the contracted lower end is uniformly subjected to the action of the blades, whose edges may be plain or serrated, or alternately plain and serrated, as shown in Figs. 5 and 6.

It is evident that owing to the grooves M, the blades may be removed and applied without separating the parts of the frame.

Having thus described my invention, what I claim as new, and desire to secure by Letters Patent, is—

1. A frame having circular grooves in the side pieces thereof, a cylinder mounted on said frame having recesses in its periphery, blades freely occupying said recesses, and gudgeons on said blades freely occupying the grooves of the frame, said grooves being eccentric to the axis of the cylinder, and the parts named combined substantially as described.

2. In a fruit grinding machine, a cylinder, movable blades in the periphery thereof, said blades having gudgeons on the sides thereof, and a frame on which said cylinder is mounted, having grooves receiving said gudgeons, said grooves being eccentric to the axis of said cylinder, substantially as described.

3. In a fruit grinding machine, a rotating cylinder having blades with gudgeons movable in recesses in the periphery of said cylinder, and a frame with eccentric grooves in its side pieces receiving said gudgeons, and passages extending from said grooves to the outer ends of said pieces, substantially as described.

4. A machine for the purpose set forth, having a hopper, a rotatable cylinder entering one side of said hopper, blades freely occupying a radial recess in the periphery of said cylinder, means for withdrawing the blades within the cylinder when outside the hopper, and a scraper outside of said hopper, and bearing against the said cylinder, said parts being combined substantially as described.

HENRY SCHMACK.

Witnesses:
JOHN A. WIEDERSHEIM,
A. P. JENNINGS.